(12) United States Patent
Rachamadugu et al.

(10) Patent No.: US 9,652,211 B2
(45) Date of Patent: May 16, 2017

(54) POLICY MANAGEMENT OF DEPLOYMENT PLANS

(71) Applicant: VMware, Inc., Palo Alto, CA (US)

(72) Inventors: Raghavendra Rachamadugu, Fremont, CA (US); Nilesh Agrawal, Sunnyvale, CA (US); Rakesh Sinha, Sunnyvale, CA (US); Vishwas Nagaraja, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 84 days.

(21) Appl. No.: 14/315,874

(22) Filed: Jun. 26, 2014

(65) Prior Publication Data

US 2015/0378700 A1  Dec. 31, 2015

(51) Int. Cl.
*G06F 9/44* (2006.01)
*G06F 9/445* (2006.01)
*G06F 9/455* (2006.01)

(52) U.S. Cl.
CPC .............. *G06F 8/60* (2013.01); *G06F 8/63* (2013.01); *G06F 8/70* (2013.01); *G06F 8/71* (2013.01); *G06F 8/34* (2013.01); *G06F 9/45558* (2013.01)

(58) Field of Classification Search
CPC ..................................... G06F 8/60; G06F 8/70
USPC .................................................. 717/174–178
See application file for complete search history.

(56) References Cited

U.S. PATENT DOCUMENTS

| | | | |
|---|---|---|---|
| 4,975,836 A | 12/1990 | Hirosawa et al. | |
| 6,691,113 B1 | 2/2004 | Harrison et al. | |
| 7,068,680 B1 | 6/2006 | Kaltenmark et al. | |
| 7,549,149 B2 | 6/2009 | Childress et al. | |
| 8,171,470 B2 | 5/2012 | Goldman et al. | |
| 8,495,611 B2 | 7/2013 | McCarthy et al. | |
| 8,732,699 B1 | 5/2014 | Hyser et al. | |
| 8,782,744 B1 | 7/2014 | Fuller et al. | |
| 9,081,747 B1 | 7/2015 | Tabieros et al. | |
| 2002/0129242 A1 | 9/2002 | Abbott | |
| 2003/0163686 A1 | 8/2003 | Ward et al. | |
| 2006/0085785 A1 | 4/2006 | Garrett | |
| 2007/0168656 A1 | 7/2007 | Paganetti et al. | |

(Continued)

FOREIGN PATENT DOCUMENTS

EP        2383652 A1    11/2011
KR    2012-0013074 A     2/2012

(Continued)

OTHER PUBLICATIONS

Chieu,"Solution-based Deployment of Complex Application Services on a Cloud",Jul. 2010, pp. 282-287.*

(Continued)

*Primary Examiner* — Duy Khuong Nguyen
(74) *Attorney, Agent, or Firm* — Patterson & Sheridan LLP

(57) ABSTRACT

A deployment system enables a developer to define a logical, multi-tier application blueprint that can be used to create and manage (e.g., redeploy, upgrade, backup, patch) multiple applications in a cloud infrastructure. The deployment system supports the use of nested policies to manage a deployment plan. Upon determining compliance to the nested policies, the application can be deployed according to an application blueprint, which means any needed VMs are provisioned from the cloud infrastructure, and application components and software services are installed.

12 Claims, 3 Drawing Sheets

(56) References Cited

U.S. PATENT DOCUMENTS

| | | |
|---|---|---|
| 2008/0114984 A1 | 5/2008 | Srinivasan et al. |
| 2008/0250407 A1 | 10/2008 | Dadhia et al. |
| 2010/0049968 A1 | 2/2010 | Dimitrakos et al. |
| 2010/0138823 A1 | 6/2010 | Thornley |
| 2010/0205205 A1* | 8/2010 | Hamel ............... G06F 17/30286 707/769 |
| 2011/0265164 A1 | 10/2011 | Lucovsky et al. |
| 2011/0265168 A1* | 10/2011 | Lucovsky ........... H04L 63/0245 726/7 |
| 2011/0296021 A1* | 12/2011 | Dorai .................... G06F 9/5072 709/226 |
| 2012/0054280 A1 | 3/2012 | Shah |
| 2012/0054736 A1 | 3/2012 | Arcese et al. |
| 2012/0170726 A1 | 7/2012 | Schwartz |
| 2012/0179822 A1 | 7/2012 | Grigsby et al. |
| 2012/0198438 A1 | 8/2012 | Auer |
| 2012/0221726 A1 | 8/2012 | Nguyen |
| 2012/0240112 A1 | 9/2012 | Nishiguchi et al. |
| 2013/0103837 A1 | 4/2013 | Krueger |
| 2013/0191528 A1 | 7/2013 | Heninger et al. |
| 2013/0227091 A1 | 8/2013 | Tompkins |
| 2013/0227560 A1 | 8/2013 | McGrath et al. |
| 2013/0232463 A1 | 9/2013 | Nagaraja et al. |
| 2013/0232480 A1 | 9/2013 | Winterfeldt et al. |
| 2013/0232497 A1* | 9/2013 | Jalagam ................ G06F 9/5072 718/104 |
| 2013/0232498 A1 | 9/2013 | Mangtani et al. |
| 2013/0263209 A1 | 10/2013 | Panuganty |
| 2013/0268674 A1 | 10/2013 | Bailey et al. |
| 2013/0297964 A1 | 11/2013 | Hegdal et al. |
| 2014/0013315 A1 | 1/2014 | Genevski et al. |
| 2014/0019538 A1 | 1/2014 | Limpaecher et al. |
| 2014/0019621 A1 | 1/2014 | Khan et al. |
| 2014/0033200 A1 | 1/2014 | Tompkins |
| 2014/0082166 A1 | 3/2014 | Robinson et al. |
| 2014/0101318 A1 | 4/2014 | Ferris et al. |
| 2014/0201218 A1* | 7/2014 | Catalano ................ G06F 8/60 707/748 |
| 2014/0201345 A1 | 7/2014 | Abuelsaad et al. |
| 2014/0215049 A1 | 7/2014 | Provaznik |
| 2014/0279201 A1 | 9/2014 | Iyoob et al. |
| 2014/0280975 A1 | 9/2014 | Mordani et al. |
| 2014/0325068 A1 | 10/2014 | Assuncao et al. |
| 2014/0365662 A1 | 12/2014 | Dave et al. |
| 2015/0163288 A1* | 6/2015 | Maes .................... H04L 67/10 709/203 |
| 2015/0347264 A1 | 12/2015 | Mohammed et al. |
| 2015/0350101 A1 | 12/2015 | Sinha et al. |

FOREIGN PATENT DOCUMENTS

| | | |
|---|---|---|
| WO | 2013104217 A1 | 7/2013 |
| WO | 2013184134 A1 | 12/2013 |

OTHER PUBLICATIONS

International Search Report and Written Opinion PCT/2015/032924, Dated Dec. 31, 2015, Consists of 12 pages.
Chieu, "Solution-based Deployment of Complex Application Services on a Cloud", Jul. 2010, pp. 282-287.
International Search Report and Written Opinion PCT/2015/033044, Dated Jul. 9, 2015, Consists of 9 pages.
International Search Report and Written Opinion PCT/2015/033394, Dated Jul. 21, 2015, Consists of 9 pages.
International Search Report and Written Opinion PCT/2015/032625, Dated Jul. 7, 2015, Consists of 9 pages.
U.S. Appl. No. 14/287,366, Final Office Action dated May 19, 2016.
U.S. Appl. No. 14/289,231, Final Office Action dated May 19, 2016.
U.S. Appl. No. 14/292,296, Office Action dated May 27, 2016.
U.S. Appl. No. 14/316,517, Office Action dated May 19, 2016.
U.S. Appl. No. 14/316,507, Office Action dated Jun. 24, 2016.
U.S. Appl. No. 14/289,231, Office Action dated Dec. 1, 2016.
U.S. Appl. No. 14/292,296, Final Office Action dated Dec. 1, 2016.
U.S. Appl. No. 14/316,517, Final Office Action dated Oct. 11, 2016.

* cited by examiner

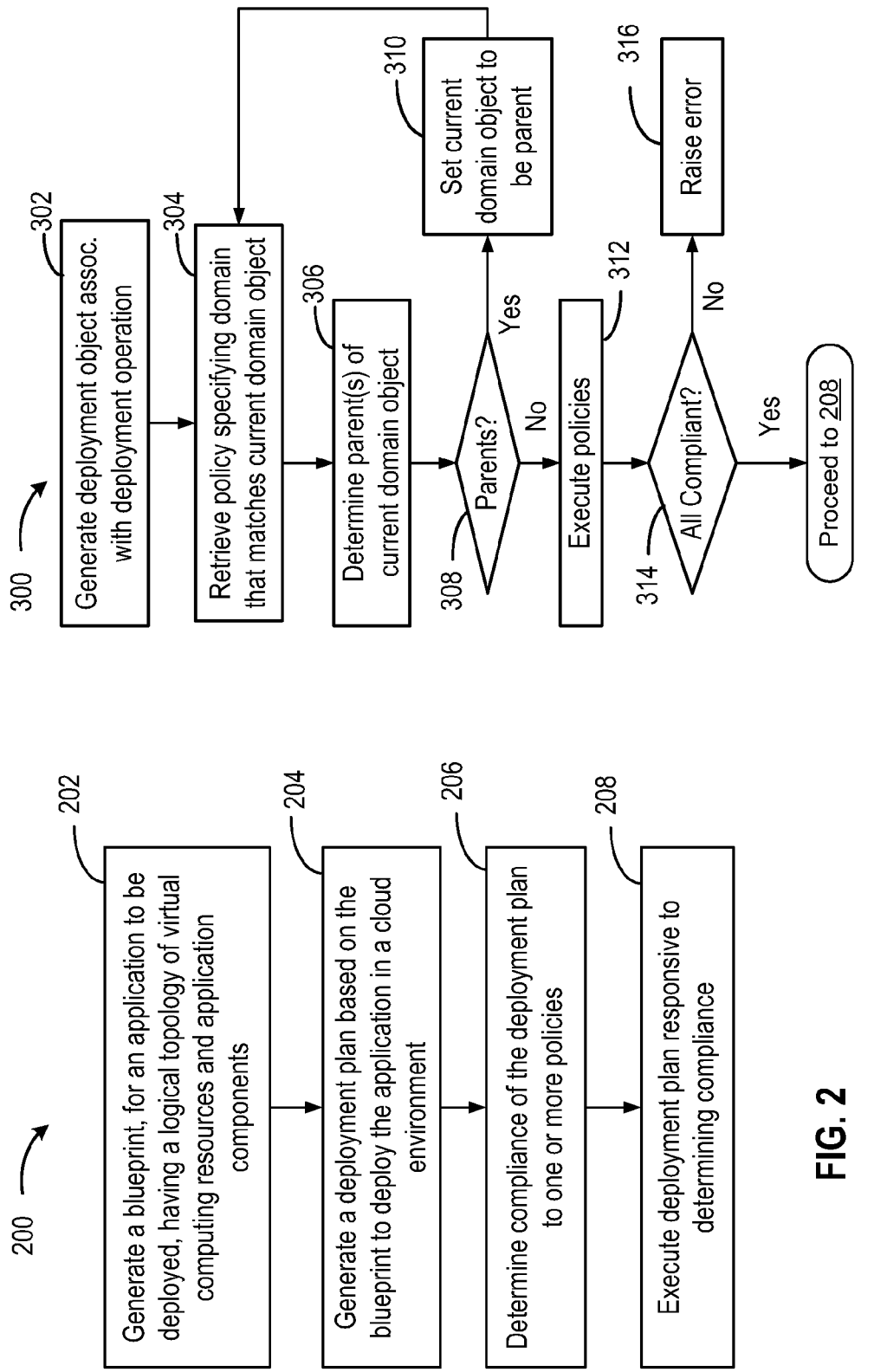

POLICY MANAGEMENT OF DEPLOYMENT PLANS

BACKGROUND

"Infrastructure-as-a-Service" (also commonly referred to as "IaaS") generally describes a suite of technologies provided by a service provider as an integrated solution to allow for elastic creation of a fully virtualized, network, and pooled computing platform (sometimes referred to as "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

SUMMARY

One or more embodiments of the present disclosure provide a deployment system for deploying a multi-tier application to a cloud computing environment. This deployment system enables a developer or "application architect" to create "application blueprints." The application blueprints define the structure of the application, enable the use of standardized application infrastructure components, and specify installation dependencies and default configurations. The application blueprints define the topology for deployment in an infrastructure-agnostic manner to be portable across different cloud computing environments.

Embodiments of the present disclosure provide a method for deploying an application. The method includes receiving a deployment plan comprising a nested object having a plurality of levels. The method further includes, for each level, retrieving a policy having a domain object that matches a current level of the nested object and determining a next level of the nested object until no next level exists. The method includes determining compliance of the deployment plan to the one or more retrieved policies, and executing the deployment plan to deploy the application in a cloud environment responsive to determining compliance.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

FIG. 2 is a flow diagram of an exemplary deployment method performed by application director to deploy an application in a deployment environment provided by cloud computing platform provider.

FIG. 3 is a flow diagram that illustrates a method for determining compliance of a deployment plan to one or more policies, according to one embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
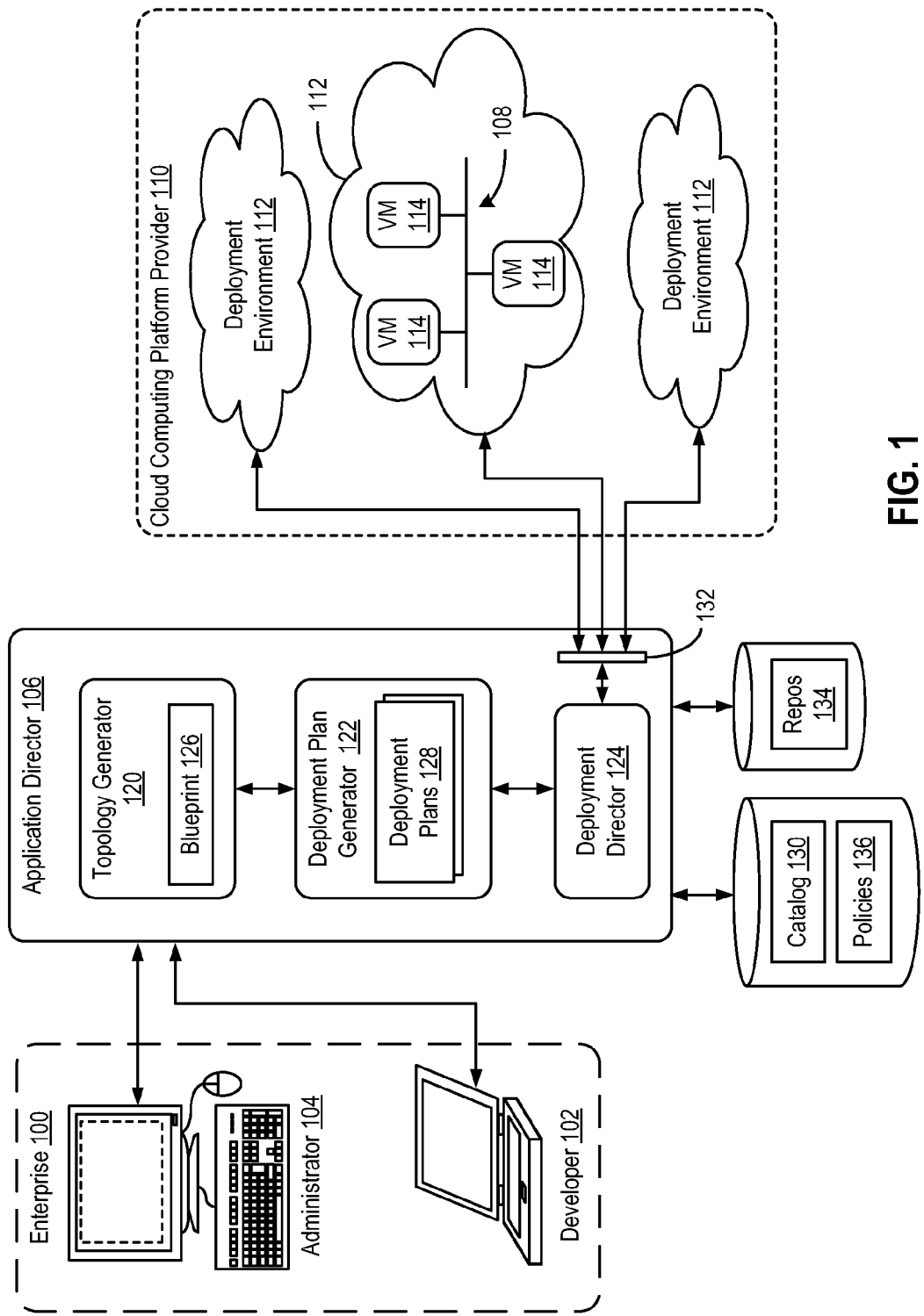
FIG. 1 depicts one embodiment of a system for deploying an application on multiple cloud computing environments.

FIG. 1 depicts one embodiment of a system for deploying an application on multiple cloud computing environments. In this embodiment, a multi-tier application created by developer 102 is being deployed for enterprise 100 in a deployment environment 112 provided by a cloud computing platform provider 110 (sometimes referred to simply as "cloud provider"). As depicted in FIG. 1, cloud computing platform provider 110 may provide multiple deployment environments 112, for example, for development, testing, staging, and production of the application. Enterprise 100 may access services from cloud computing platform provider 110, for example, via REST (Representational State Transfer) APIs (Application Programming Interface) or any other client-server communication protocol. One particular implementation of a REST API for cloud computing services is vCloud Director API available from VMware, Inc. Cloud computing platform provider 110 provisions virtual computing resources (e.g., virtual machines, or "VMs," 114) to provide a deployment environment 112 in which enterprise 100 can deploy its multi-tier application. One particular example of a deployment environment is one implemented using cloud computing services from a vCloud DataCenter available from VMware, Inc.

A developer 102 of enterprise 100 uses an application director 106, which may be running in one or more VMs, to orchestrate deployment of a multi-tier application 108 onto one of deployment environments 112 provided by a cloud computing platform provider 110. As illustrated, application director 106 includes the following software modules: a topology generator 120, a deployment plan generator 122, and a deployment director 124. Topology generator 120 generates a blueprint 126 that specifies a logical topology of the application 108 to be deployed. Blueprint 126 generally captures the structure of an application 108 as a collection of application components executing on virtual computing resources.

For example, blueprint 126 generated by application director 106 for an online store application may specify a web application (e.g., in the form of a Java web application archive or "WAR" file comprising dynamic web pages, static web pages, Java servlets, Java classes, and other property, configuration and resources files that make up a Java web application) executing on an application server (e.g., Apache Tomcat application server) and that uses as a database (e.g., MongoDB) as a data store. It is recognized that the term "application" is used herein to generally refer to a logical deployment unit, comprised of application packages and their dependent middleware and operating systems. As such, in the example described above, the term "application" may refer to the entire online store application, including application server and database components, rather than just the application logic of the web application itself.

Blueprint 126 may be assembled out of items from a catalog 130, which is a listing of available virtual computing resources (e.g., VMs, networking, storage) that may be provisioned from cloud computing platform provider 110 and available application components (e.g., software services, scripts, code components, application-specific packages) that may be installed on the provisioned virtual computing resources. Catalog 130 may be pre-populated and customized by an administrator 104 (e.g., IT or system administrator) that enters in specifications, configurations, properties, and other details about each item in catalog 130. Blueprint 126 may define one or more dependencies between application components to indicate an installation order of the application components during deployment. For example, since a load balancer usually cannot be configured until a web application is up and running, developer 102 may specify a dependency from an Apache service to an application code package.

Deployment plan generator 122 of application director 106 generates a deployment plan 128 based on blueprint 126 that includes deployment settings for blueprint 126 (e.g., virtual computing resources' cluster size, CPU, memory, networks) and an execution plan of tasks having a specified order in which virtual computing resources are provisioned and application components are installed, configured, and started. Deployment plan 128 provides an IT administrator with a process-oriented view of blueprint 126 that indicates discrete steps to be performed to deploy application 108. Different deployment plans 128 may be generated from a single blueprint 126 to test prototypes (e.g., new application versions), to scale-up and scale down deployments, or deploy application 108 to different deployment environments 112 (e.g., testing, staging, production).

Deployment director 124 of application director 106 executes deployment plan 128 by communicating with cloud computing platform provider 110 via a cloud interface 132 to provision and configure VMs 114 in a deployment environment 112, as specified by deployment plan 128. Cloud interface 132 provides a communication abstraction layer by which application director 106 may communicate with a heterogeneous mixture of cloud provider 110 and deployment environments 112. After application 108 has been deployed, application director 106 may be utilized to monitor and modify (e.g., scale) the deployment.

According to embodiments of the present disclosure, deployment director 124 of application director 106 is configured to determine compliance of deployment plan 128 to one or more policies 136. A policy 136 is a statement of declaration that controls designated aspects of a target system, i.e., deployment of an application. In one embodiment, policies 136 may be specified by a user (e.g., administrator 104) and enforced on other users (e.g., developer 102) when those other users deploy an application into one of deployment environments 112 provided by a cloud computing platform provider 110. Deployment director 124 may generate a "compliance view" user interface that lists all policies applicable to a target deployment, and an indication of whether the target deployment complies with each policy. While embodiments describe identify policies 136 that are applicable to a deployment of an application, deployment director 124 may traverses a data model which reflects the hierarchy associated with any action (i.e., deployment), and retrieves any policies 136 matching that level of the hierarchy.

In one embodiment, policies 136 may be attachable (to various points of interest), propagatable (through a hierarchy of objects), scannable and reportable (to assess a system's compliance against the policy), remediable (e.g., mutate the target system to make the system compliant), and exceptionable (i.e., approval-driven policy exceptions). For example, a blacklist policy that prohibits a deployment from having a particular software service as part of its topology may be "attached" to a deployment hierarchy level associated with deployment environments. In another example, a maximum memory policy specifying that no node in a deployment may have more than a particular amount (e.g., 1024 MB) of RAM may include a "remedial" action that modifies (i.e., decreases) the allocated RAM for any violating node in the deployment to make the target system compliant. In yet another example, a maximum VM count policy specifying that no deployment may exceed a particular number of VMs may permit exceptions to the policy in response to approval (e.g., granted by an administrator) that a violating deployment can still proceed despite having excess VMs. It is recognized that these are merely illustrative examples, and other types of policies may be used.

FIG. 2 is a flow diagram of an exemplary deployment method performed by application director 106 to deploy an application in a deployment environment 112 provided by cloud computing platform provider 110. It should be recognized that, even though the method is described in conjunction with the systems of FIG. 1, any system configured to perform the method steps, in any order, is within the scope of embodiments of the invention.

In step 202, in response to user inputs (e.g., from developer 102), application director 106 generates a blueprint 126, for an application to be deployed, that includes a logical topology of virtual computing resources and application components for supporting the application. In one implementation, developer 102 may utilize a graphical user interface provided by application director 106 to assemble and arrange items from catalog 130 into a topology that represents virtual computing resources and application components for supporting execution of application 108.

In step 204, application director 106 generates a deployment plan 128 based on blueprint 126 to deploy application 108 in a specific cloud environment (e.g., deployment environments 112). Step 204 may be carried out in response to user inputs (e.g., from developer 102) that initiate a deployment process for application 108 on a specified deployment environment. From an application blueprint 126, a user may generate multiple deployment plans 128 having configurations customized for a variety of deployment environments and/or cloud providers, for example, for testing prototypes, deploying to staging environments, or upgrading existing deployments. While blueprints 126 provide a component-oriented view of the application topology, deployment plans 128 provide a step-oriented view of the application topology defined in blueprint 126 that depicts time dependencies between tasks to deploy the application components in a particular order. Deployment plans 128 provide settings, such as cloud templates, networks, and application component properties allowed for use in specific deployment environments.

In step 206, application director 106 determines compliance of deployment plan 128 to one or more policies 136. In one embodiment, a deployment may be characterized as a nested object, and a policy 136 may target a specific level within that nested object. Using the example system of FIG. 1, a deployment generally involves a particular deployment plan 126 (first level), which specifies a particular deployment environment 112 (second level), of a particular cloud computing platform provider 110 (third level). To identify policies 136 that are applicable to a deployment, application director 106 traverses a data model which reflects the hierarchy associated with a deployment, and retrieves any policies 136 matching that level of the hierarchy. Operations for determining policy compliance are described in further detail in FIG. 3.

In step 208, application director 106 executes deployment plan 128 responsive to determining compliance of the deployment plan to policies 136. In some embodiments, a policy 136 may have a critical priority, which causes a target deployment plan to not be executed in case of non-compliance, or a non-critical priority (e.g., warning priority), which permits a deployment plan to be executed anyway, but with accompanying error messages and/or warning indications.

FIG. 3 is a flow diagram that illustrates a method 300 for determining compliance of a deployment plan to one or more policies, according to one embodiment of the present disclosure. To facilitate explanation, method 300 is described in conjunction with FIG. 4, which is a block diagram depicting a deployment object 402 used to manage one or more policies 136, according to an embodiment.

At step 302, application director 106 generates a deployment object 402 associated with a deployment operation. It is recognized that deployment object 402 may be obtained as part of step 204 of method 200 described earlier. Deployment object 402 is a data object that encapsulates data associated with an application blueprint 126 and data associated with a deployment plan 128. In one embodiment, deployment object 402 is a nested object having a plurality of levels that represent different aspects, or "domains", of the deployment operation. Deployment object 402 may be comprised of a plurality of domain objects 404, which are data objects that encapsulate data associated with a particular domain.

Figure 4:
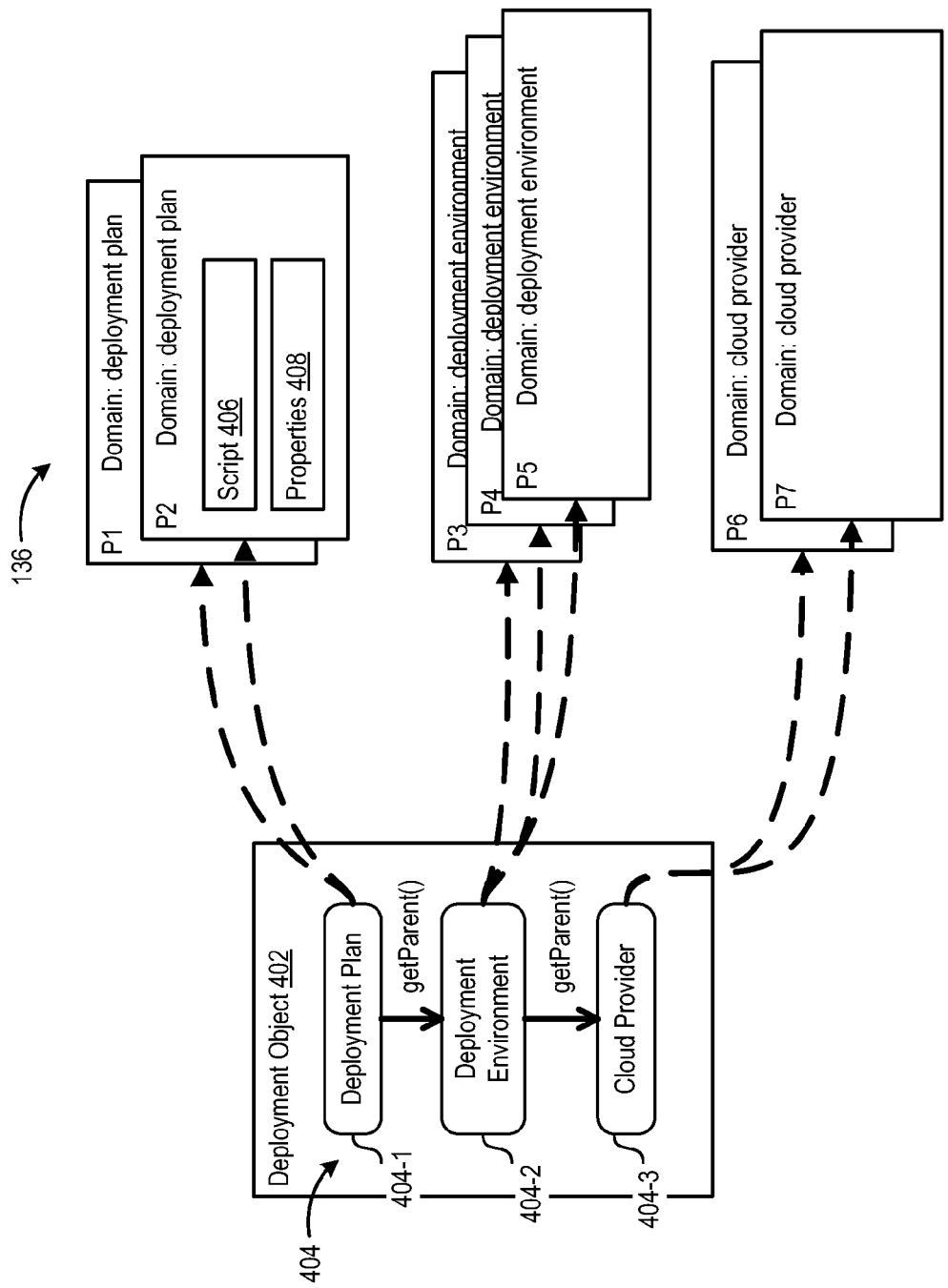
FIG. 4 is a block diagram depicting a deployment object used to manage one or more policies, according to an embodiment.

In the example shown in FIG. 4, deployment object 402 includes a first domain object 404-1 associated with deployment plan 128, a second domain object 404-2 associated with deployment environments 112, and a third domain object 404-3 associated with cloud providers 110. These domain objects 404-1 to 404-3 encapsulate data associated with each deployment-related domain. For example, the deployment plan domain object (e.g., 404-1) may contain plan-related data such as a topology for a three-tier application to be deployed, a listing of applications components to be installed and on how many nodes (e.g., VMs 114). The deployment environment domain object (e.g., 404-2) may contain environment-related data, properties, and parameters, such as an indication of the type of deployment environment (e.g., production, development). The cloud provider data object (e.g., 404-3) may contain provider-related data, such as login credentials, authentication keys, and cloud gateway addresses.

To determine which policies 136 are applicable to the deployment, application director 106 retrieves policies while traversing through the hierarchy of domain objects of deployment object 402, starting with a first domain object (e.g., object 404-1). In one embodiment, at step 304, application director 106 retrieves any policies 136 specifying a deployment domain that match a current domain object. For example, as shown in FIG. 4, on a first pass, application director 106 retrieves policies P1 and P2 that specify the domain of "deployment plan." A policy 136 may target a particular deployment domain in order to control the deployment based on data from that domain. For example, a policy P may be a maximum memory policy, i.e., that, in any deployment, no node may have more than particular amount (e.g., 1024 MB) of RAM. To enforce such a policy P1, data would be needed from deployment plan 128, i.e., from the deployment plan domain. In another example, a policy P2 may be a maximum VM count policy, i.e., that no deployment may exceed a particular number of VMs.

Responsive to retrieving the policies, application director 106 traverses to a next level of deployment object 402. In one embodiment, at step 306, application director 106 determines a parent of the current domain object. In one implementation, each domain object 404 may be configured to support a class interface for determining a next level (i.e., parent) of that domain object 404. To determine the parent of a current domain object, application director 106 may invoke a function (e.g., getParent( ) of the instance of the current domain object and obtain handle to the parent. In the example in FIG. 4, application director 106 may determine that the parent of deployment plan object 404-1 is deployment environment object 404-2.

Responsive to determining that a parent object exists for the current domain object, at step 310, application director 106 proceeds to set the current domain object to be the parent. Application director 106 may proceed to retrieve policies 136 that match that the new current domain object (e.g., step 302) and determine a next level to domain object (e.g., step 304) until application director 106 determines no next level exists.

In the example in FIG. 4, application director 106 sets the current domain object to be "deployment environment" and retrieves any policies specifying "deployment environment" as the domain. Specifically, application director 106 retrieves policies P3, P4, and P5 having a domain that matches the current domain object of "deployment environment." As with the policies P1 and P2, policies P3, P4, and P4 control aspects of the deployment except in this case based on data from the deployment environment domain. For example, policy P3 may be a blacklist service policy that prohibits a multi-tier application having a particular software service as part of its topology from deploying in a particular type of deployment environment. Such policies may be useful in enforcing software licensing restrictions between production and development deployment environments. To enforce such a policy, data would be needed from a deployment environment object, e.g., indicating the type of deployment environment has been specified for this deployment.

Continuing with this example, application director 106 may next determines a parent of deployment environment object 404-2 is cloud provider object 404-3, e.g., by invoking getParent( ) on the instance of object 404-2, and sets the current domain object as cloud provider object 404-3. Application director 106 retrieves policies P6 and P7 having a domain that matches the current domain of "cloud provider."

Referring back to FIG. 3, at step 308, application director 106 may determine that no parent object exists for the current domain object. For example, when application director 106 attempts to determine a parent of cloud provider object 404-3, no parent object is found, as this example hierarchy ends at the cloud provider level. At this point, application director 106 has gathered together a plurality of policies P1, P2, P3, P4, P5, P6, and P7.

At step 312, responsive to determining that no parent object exists for the current domain object, application director 106 executes the plurality of retrieved policies 136 associated with the deployment. In one embodiment, a policy 136 may include or may be embodied as a script 406 comprising program code that, when executed, determines a state of compliance using data from deployment object 402 as a "payload." In one implementation, a policy 136 may comprise JavaScript program code configured to determine a state of compliance of deployment object 402. An example policy 136 is shown as pseudo-code in Table 1 below.

TABLE 1

Sample pseudo-code for a deployment policy

```
// Policy properties
var min_cpu_count;
var max_cpu_count;
// Policy input
var eventPayload;
var deploymentProfile = eventPayload.getDeploymentProfile( );
var /*String*/ complianceResult = "COMPLIANT";
var /*String*/ complianceMessage = "";
foreach deploymentProfile.getProfileNodes( ) as nodes
    foreach nodes.getProperties( ) as prop
        var propDefinition = prop.getPropertyDefinition( );
        if (propDefinition.getKey( ).equals("vCPU")) {
            var cpu = prop.getValue( );
            if (cpu < min_cpu_count || cpu > max_cpu_count) {
                set msg = "Policy Violation: ...";
                complianceResult = "NON_COMPLIANT";
                complianceMessage += msg;
            }
        }
    end foreach
end foreach
```

In some embodiments, a policy 136 may include one or more properties 408, which are input parameters used by script 406 in determining compliance. Properties 408 enable a script 406 to be written in a generalized manner. A user may create an "instance" of a policy 136 and specify a particular property value for that instance. For example, a user may create an instance of a generalized maximum memory policy that specifies a value for a property "max_mem" to be "1024". In the example policy shown in Table 1, properties 408 are declared for a minimum number of CPUs ("var min_cpu_count") and a maximum number of CPUs ("var max_cpu_count"). For simplicity of explanation, policies and instances of policies may be referred to interchangeably.

In one embodiment, application director 106 executes the plurality of policies 136 in a sandbox environment, with limited access to the execution environment except for deployment object 402, i.e., the payload. In one implementation, policies 136 may be embodied as program code written in a scripting language (e.g., JavaScript), and are executed by an application director 106 software module implemented in a different programming language (Java). In such implementations, application director 106 may use a framework configured to support embedding scripts, such as policies 136, into its Java source code, and providing access to Java objects (e.g., deployment object 402) configured to be exposed to policies 136. One example framework for supporting other scripting languages may be found in Java Specification Request (JSR) 223, describing scripting for the Java platform.

At step 314, application director 106 determines whether the deployment plan is compliant with all of the plurality of policies 136. In one embodiment, execution of a policy 136 may generate an indication (i.e., "COMPLIANT" or "NON-COMPLIANT") of whether the deployment plan is compliant with that policy. The indications from executing all of the plurality of policies 136 may be aggregated and use to consider whether compliance has been determined. If so, application director 106 may proceed to execute the deployment, as in step 208 of method 200 described earlier. Otherwise, at step 316, application director 106 may raise an error indicating the deployment plan does not comply with at least one of the plurality of policies 136 associated with the deployment plan. In some embodiments, the error may include one or more error messages generated by (execution of) policies 136. The generated error messages may be displayed in a "Compliance View" graphical user interface provided by application director 106. In other embodiments, policies 136 may define one or more remedial actions to be performed in response to a policy violation, such as uninstalling a blacklisted software service, or notifying an administrator of the policy violation.

While the particular embodiments are described herein determining compliance of a deployment plan to one or more policies, it should be noted that embodiments may be extended to determine compliance of other data objects encapsulating deployment-related data. In one instance, embodiments may be extended to support policies for an upgrade plan for an existing deployment by simply defining a new hierarchy of domain objects corresponding to an upgrade plan. For example, the ne nested data object may include a hierarchy comprised of an upgrade plan domain object and a deployment environment domain object (but not a cloud provider domain object). Accordingly, embodiments of the present disclosure provide a technique for defining nested policies in a system based on a domain object reference, without having to change the underlying framework that executes the policies.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for deploying an application, the method comprising:
   receiving a deployment plan comprising a nested object having a plurality of levels, wherein the nested object comprises at least one level selected from the group of levels representing a deployment plan, a deployment environment, and a cloud computing environment;
   for each level, retrieving a policy having a domain object that matches a current level of the nested object and determining a next level of the nested object until no next level exists, wherein the one or more retrieved policies comprises a script accessing information about the deployment plan from the nested object, wherein the nested objected is a data structure of a first programming language exposed to the policy that is written in a second programming language;
   determining compliance of the deployment plan to the one or more retrieved policies; and
   executing, by a computer processor, the deployment plan to deploy the application in a cloud environment responsive to determining compliance.

2. The method of claim 1, wherein determining the compliance of the deployment plan to the one or more retrieved policies comprises:
   executing the one or more retrieved policies.

3. The method of claim 1, wherein the nested object comprises a plurality of domain objects configured to support an interface that retrieves a parent of the respective domain object.

4. The method of claim 1, wherein determining the next level of the nested object comprises invoking a class method of the nested object configured to get a parent of the nested object.

5. A non-transitory computer-readable storage medium comprising instructions that, when executed in a computing device, for deploying an application, by performing the steps of:
   receiving a deployment plan comprising a nested object having a plurality of levels, wherein the nested object comprises at least one level selected from the group of levels representing a deployment plan, a deployment environment, and a cloud computing environment;
   for each level, retrieving a policy having a domain object that matches a current level of the nested object and determining a next level of the nested object until no next level exists, wherein the one or more retrieved policies comprises a script accessing information about the deployment plan from the nested object, wherein the nested objected is a data structure of a first programming language exposed to the policy that is written in a second programming language;
   determining compliance of the deployment plan to the one or more retrieved policies; and
   executing the deployment plan to deploy the application in a cloud environment responsive to determining compliance.

6. The non-transitory computer-readable storage medium of claim 5, wherein determining the compliance of the deployment plan to the one or more retrieved policies comprises:
   executing the one or more retrieved policies.

7. The non-transitory computer-readable storage medium of claim 5, wherein the nested object comprises a plurality of domain objects configured to support an interface that retrieves a parent of the respective domain object.

8. The non-transitory computer-readable storage medium of claim 5, wherein determining the next level of the nested object comprises invoking a class method of the nested object configured to get a parent of the nested object.

9. A computer system for deploying an application, the computer system comprising:
   a system memory comprising a program; and
   a processor configured to execute the program and carry out the steps of:
      receiving a deployment plan comprising a nested object having a plurality of levels, wherein the nested object comprises at least one level selected from the group of levels representing a deployment plan, a deployment environment, and a cloud computing environment;
      for each level, retrieving a policy having a domain object that matches a current level of the nested object and determining a next level of the nested object until no next level exists, wherein the one or more retrieved policies comprises a script accessing information about the deployment plan from the nested object, wherein the nested objected is a data structure of a first programming language exposed to the policy that is written in a second programming language;
      determining compliance of the deployment plan to the one or more retrieved policies; and
      executing the deployment plan to deploy the application in a cloud environment responsive to determining compliance.

10. The computer system of claim 9, wherein determining the compliance of the deployment plan to the one or more retrieved policies comprises:
    executing the one or more retrieved policies.

11. The computer system of claim 9, wherein the nested object comprises a plurality of domain objects configured to support an interface that retrieves a parent of the respective domain object.

12. The computer system of claim 9, wherein determining the next level of the nested object comprises invoking a class method of the nested object configured to get a parent of the nested object.

* * * * *